J. V. GIESLER

1,628,137

REGULATING DEVICE

Filed Aug. 30, 1922

Inventor

Jean V. Giesler

By Mauro, Cameron, Lewis & Kerkam

Attorneys

Patented May 10, 1927.

1,628,137

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

REGULATING DEVICE.

Application filed August 30, 1922. Serial No. 585,328.

This invention relates, primarily, to devices for regulating the humidity of the air, but certain features and combinations of elements thereof are capable of wider application and adapted to a variety of uses.

It has heretofore been proposed to provide a humidity regulating device which includes a pair of expansible and collapsible vessels that communicate respectively with bulbs subjected to the wet and the dry bulb temperatures of the air and which operate by differential expansion and contraction to actuate a valve that controls the supply of moisture to the air. It is an object of this invention to provide a device of this character which is more compact than devices of this type heretofore proposed and which constitutes a simple and efficient self-contained unit.

Another object of this invention is to provide a humidity regulating device which is controlled by the difference between the wet and the dry bulb temperatures of the air and which includes means whereby the wet and the dry bulb temperatures may be indicated at a place remote from the wet and the dry bulb elements—preferably adjacent the device which controls the supply of moisture to the air.

Another object of this invention is to provide a device which includes a pair of expansible and collapsible vessels that have operative connections with means to be controlled, and also, if desired, adjusting mechanism, and which is so constructed and arranged as to possess superior compactness and simplicity to devices of this type heretofore suggested.

Another object of this invention is to provide a device responsive to temperature variations which includes one or more bulbs that are subjected to temperature conditions at a place remote from the motor vessel or vessels for operating the means to be controlled and which also includes means adjacent said vessel or vessels for indicating the temperature conditions at said bulb or bulbs.

Another object of this invention is to provide a humidity regulating device which includes a pair of bulbs for subjection to the wet and the dry bulb temperatures of the air that may be readily installed as a unit and that are also preferably adapted to cause the same pressure to be exerted at the motor vessels of said device when said bulbs are at the same temperature.

Another object of the invention is to provide a humidity regulating device which includes a pair of bulbs subjected respectively to the wet and the dry bulb temperatures of the air and temperature indicating means adjacent the motor vessels of said device which are adjustable to compensate for different elevations of said bulbs.

Another object of this invention is to provide a humidity regulating device, which is controlled by the difference between the wet and the dry bulb temperatures of the air, with improved means for predetermining and indicating the difference between said temperatures at which said device is adapted to respond.

Another object of this invention is to provide a humidity regulating device wherein the component parts are compactly mounted in unitary relation so as to facilitate transportation and installation of the same.

Other objects will appear as the description of the invention proceeds.

Stated generally the invention as applied to a humidity regulating device includes the combination of a valve or other suitable means for controlling the quantity of moisture to be supplied to the air and a pair of expansible and collapsible vessels charged with a fluid the pressure of which in the respective vessels is caused to vary in conformity with the variations in the wet and the dry bulb temperatures of the air, said vessels to this end preferably communicating with bulbs one of which is subjected to the wet bulb temperature of the air, as by evaporation from a moisture-saturated wick surrounding the same, and the other of which is subjected to the dry bulb temperature of the air. In conformity with this invention, said vessels are preferably mounted as a unit with their remote end walls held fixedly in position, so that said vessels act in opposition, and a member is interposed between said vessels, and preferably acts as a movable end wall for both of them, to be operated by the differential expansion and contraction of said vessels, said vessels being preferably made of annular formation so as to provide a central chamber at their axis in which the connections to the valve or other moisture controlling means and a spring or other suitable means for controlling the operation of said vessels may be housed. The bulbs are also preferably mounted as a unit and in axial alignment. The device is also preferably provided at or adjacent said vessels with means for indicating the temperatures existing at the bulbs to facilitate adjustment of said spring or other means for controlling the operation of said vessels to maintain a predetermined difference of temperature between the wet and the dry bulb temperatures of the air. Said spring or other means is also preferably provided with means for indicating its adjustment, and the means for indicating the temperatures existing at the bulbs is preferably adjustable to compensate for different elevations of said bulbs.

The invention is capable of receiving a variety of mechanical expressions, one or more of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same characters of reference are employed to designate corresponding parts in the several figures:—

Fig. 3 is an elevation, partly broken away, of a gage which may be employed in embodiments of the present invention.

In the form shown, the device for regulating the supply of moisture to the air takes the form of a valve 10 of any suitable construction and adapted to control the supply of steam or spray to the air, or the supply of heating medium to a vaporizing pan or pans, etc., although any other suitable means for regulating the moisture supply may be employed and, so far as respects certain features of this invention, said valve 10 is to be construed as typical of any suitable means to be controlled. Mounted on the valve casing 11, as by clamping the same between the bonnet 12 and a lock nut 13, is a frame 14, of any suitable construction, carrying at its upper end a housing 15 which may be formed integrally with the frame 14 or be suitably attached thereto. At its lower end said housing 15 is provided with a transverse brace or web 16, integral with or suitably attached to said housing 15, said brace leaving apertures 17 between the same and the lateral wall of said housing for a purpose to be hereinafter explained. The upper end of said housing is closed by a cap 18 which may be connected thereto by screws or any other suitable means.

Mounted within said housing 15 is a pair of expansible and collapsible vessels, 19 and 20 respectively. Vessel 19 is preferably formed of inner and outer corrugated flexible tubular walls, 21 and 22 respectively, the annular space between said walls, which are preferably arranged concentrically, being closed at its opposite ends by preferably-rigid end walls, 23 and 24 respectively, which are suitably attached to the corrugated tubular walls, as by brazing, so as to afford a fluid-tight vessel which is annular in cross section and which provides an inner central chamber 25 at its axis for the connections to be described. Vessel 20 is also preferably formed of inner and outer corrugated flexible tubular walls, 26 and 27 respectively, arranged concentrically and forming an interior space which is annular in cross section and which is closed at its opposite ends by the preferably-rigid annular end walls, 28 and 29 respectively, said vessel also forming a central axial chamber 30 for the spring adjusting means to be described. Annular stops 31 and 32 may be mounted in said vessels 19 and 20 respectively to limit the extent of contraction thereof.

The vessels 19 and 20 are preferably mounted in axial alignment and in opposition to one another, so that they tend to expand and contract in opposite directions. To this end, the remote end walls 23 and 29 of said vessels are held fixedly in position. End wall 23 is mounted in any suitable way on the brace 16, preferably with a sheet of insulating material 33 interposed between said wall 23 and the brace 16 to minimize conduction of heat to the vessel 19 through the frame 14. In the form shown, a pair of bolts 34 are suitably attached, as by brazing, to the end wall 23 and extend through apertures 35 in the brace 16, whereby said end wall 23 may be clamped fixedly to the brace 16 by nuts 36 on the projecting ends of said bolts 34. The brace 16 therefore constitutes an abutment wall for the vessel 19. The abutment wall for the vessel 20 is afforded by the cap 18 and, to this end, the cap is preferably provided with an annular rib 37 adapted to engage the end wall 29 of said vessel, said end wall 29 being fixedly held in position against said rib 37 in any suitable way, as by one or more bolts 38 brazed or otherwise suitably attached to said end wall 29 and projecting through apertures in the cap for the application of a nut or nuts thereto, as heretofore described in connection with the bolts 34.

The movable end walls 24 and 28 of said vessels 19 and 20 respectively are therefore arranged in opposition to each other, and in juxtaposition, and are connected to the valve 10 in any suitable way, preferably by means including a plate or member 39 interposed between said movable end walls 24 and 28 and acting as a common movable end wall for both of said vessels. Said end walls 24 and 28 may merely engage the common movable wall 39 to facilitate assembly and disassembly or, if desired, said walls 24 and 28 may be attached to or formed integrally with said interposed wall 39. Said wall 39 is suitably connected to the valve 10, as by a rod 40 having screw-threaded engagement with a sleeve 41 connected to the wall 39 by a plurality of arms 42 and also having a screw-threaded connection 43 with the valve stem 44. These connections from the movable wall 39 to the valve stem 44 are disposed in the central axial chamber 25 of the vessel 19 as is clearly shown in Figs. 1 and 2.

To control the expansion and contraction of the vessels 19 and 20, means of any suitable construction and preferably taking the form of a coil spring 45 is mounted in engagement with the movable wall 39 in the central axial chamber 30 of the vessel 20, said spring at its upper end engaging a collar 46 carried by a nut 47 which may move up and down on the screw-threaded stem 48 but which is held against rotation by the engagement of wings or projections 49 on said nut in the slots 50 of a tubular housing 51 for said threaded stem. Said threaded stem 48 may be rotated by the engagement of a suitable key with its upper squared end 52, said end being shown as disposed at the bottom of a tubular aperture 53 in the housing 54, so that the stem 48 may be operated only by inserting the key in the aperture 53—thereby ensuring against unauthorized persons tampering with the adjustment of the device.

To indicate the adjustment of the spring 45 the nut 47 is preferably provided with an arm 55 which terminates in a pointer 56 cooperating with a suitably calibrated scale-plate 57. To permit adjustment of said scale-plate for a reason to be hereinafter explained, said plate is preferably provided with elongated apertures 58 and is secured to the housing 54 by screws 59 extending through said apertures.

Figure 1:
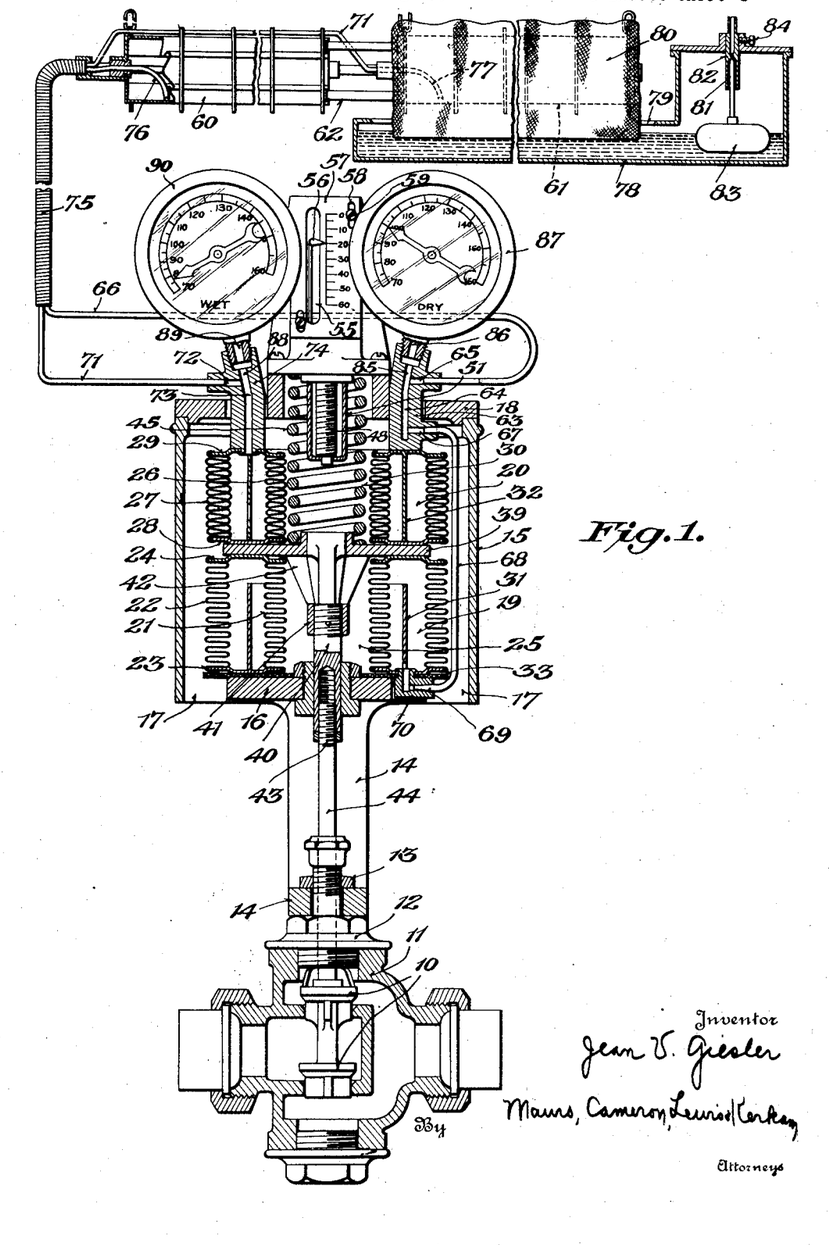
Fig. 1 is an elevation, partly in section, of a humidity regulating device embodying the present invention.

In the form shown, each of the expansible and collapsible vessels 19 and 20 communicates with a bulb one of which is designed to be subjected to the dry bulb temperatures of the air and the other of which is designed to be subjected to the wet bulb temperature of the air. Referring to Fig. 1, the dry bulb is indicated at 60 and the wet bulb at 61. These bulbs may be of any suitable construction, being shown as provided with axial corrugations as disclosed and claimed in the application of Jean V. Giesler, Ser. No. 478,352, filed June 17, 1921. Said bulbs 60 and 61 are preferably connected in any suitable way, as by bolts 62, so as to form a unit, and are preferably arranged in axial alignment so that when the unit is installed horizontally both bulbs are at the same altitude.

The bulbs 60 and 61 may be connected to the vessels 19 and 20 in any suitable way. In the construction illustrated, the cap 18 of the housing 15 has projecting therethrough a plug 63 which has an axially-extending passage 64 and a branch passage 65 with which communicates the end of a tube 66 that at its opposite end communicates with the dry bulb 60. Said axially extending passage 64 terminates at its lower end in a passage 67 with which communicates a pipe 68 that extends downwardly within the housing 15, between its lateral wall and the exterior walls of the vessels 19 and 20, and communicates at its lower end with a passage 69 in a plug 70 suitably attached, as by brazing, to the end wall 23 of the vessel 19. Dry bulb 60 is therefore in communication with the vessel 19 through the tube 66, passages 65, 64 and 67, tube 68 and passage 69. Wet bulb 61 is in communication with the interior of the vessel 20 through a tube 71 which communicates through a branch passage 72 with the axial passage 73 in a plug 74 projecting through the cap 18, said passage 73 communicating directly with the interior of the vessel 20.

The tubes 66 and 71 are preferably flexible and for simplicity of construction and convenience of installation are preferably encased in a common armor 75. The bulbs 60 and 61, together with their corresponding vessels 19 and 20, are charged with a thermosensitive fluid of any suitable character, preferably a volatile liquid. In such event, the vessels 19 and 20 and their corresponding tubes 66 and 71 are preferably maintained full of liquid, and sufficient liquid is placed in each of the bulbs 60 and 61 so that under the conditions of maximum expansion of the vessels 19 and 20 a substantial body of unvolatilized liquid will remain in each of the bulbs. The remainder of the space in each of said bulbs is filled with the vapor of said liquid and, to prevent the passage of said vapor into the tubes and vessels, said tubes 66 and 71 preferably project into the bulbs 60 and 61 respectively, as shown at 76 and 77 respectively, and are bent downwardly so that their ends are always immersed in the body of liquid in each bulb.

Any suitable means is provided for subjecting the bulb 61 to the wet bulb temperature of the air. In the form shown, a water tank 78 is mounted below the bulb 61 and has an aperture 79 in its upper wall. A wick 80 surrounds the bulb 61 and its ends project down into the water in the tank 78. The wick 80 is therefore maintained saturated with water and, by the evaporation of water from said wick, the bulb 61 is maintained at the wet bulb temperature of the air. The tank 78 may be supplied with water in any suitable way, but the water is preferably maintained at a substantially uniform level by a float-operated valve 81 which engages a valve seat in a tubular inlet member 82. To provide for adjustment of the level of the water in the tank 78, said tubular inlet member 82 may be raised and lowered so as to adjust the height of the water at which the float 83 causes the valve 81 to engage its seat. The tubular member 82 may be maintained in adjusted position in any suitable way, by a set screw 84.

Means are preferably provided adjacent the vessels 19 and 20 for indicating the temperatures existing at the bulbs 60 and 61 respectively. As the pressure of the thermosensitive fluid in each combined bulb and vessel varies in conformity with the temperature to which the bulb is subjected, the temperature at each bulb can be indicated by measuring the pressure at any suitable point in the system composed of a bulb, its vessel and the communicating tubing. In the form shown in Figs. 1 and 2, a pressure gage is mounted on the housing 15 in communication with each combined bulb and vessel. To this end, the plug 63 is provided with another branch passage 85 with which communicates the passage in the threaded nipple 86 of a pressure gage 87 of any suitable construction; the plug 74 is also similarly provided with a branch passage 88 with which communicates the passage in the threaded nipple 89 of a pressure gage 90 of any suitable construction. As the pressures in the combined bulbs and vessels vary in conformity with the temperatures, the dial plates of the gages 87 and 90 may be calibrated in terms of temperature instead of pressure, and thereby the temperatures existing at each of said bulbs may be read directly from the dials of the pressure gages 87 and 90.

Figure 2:
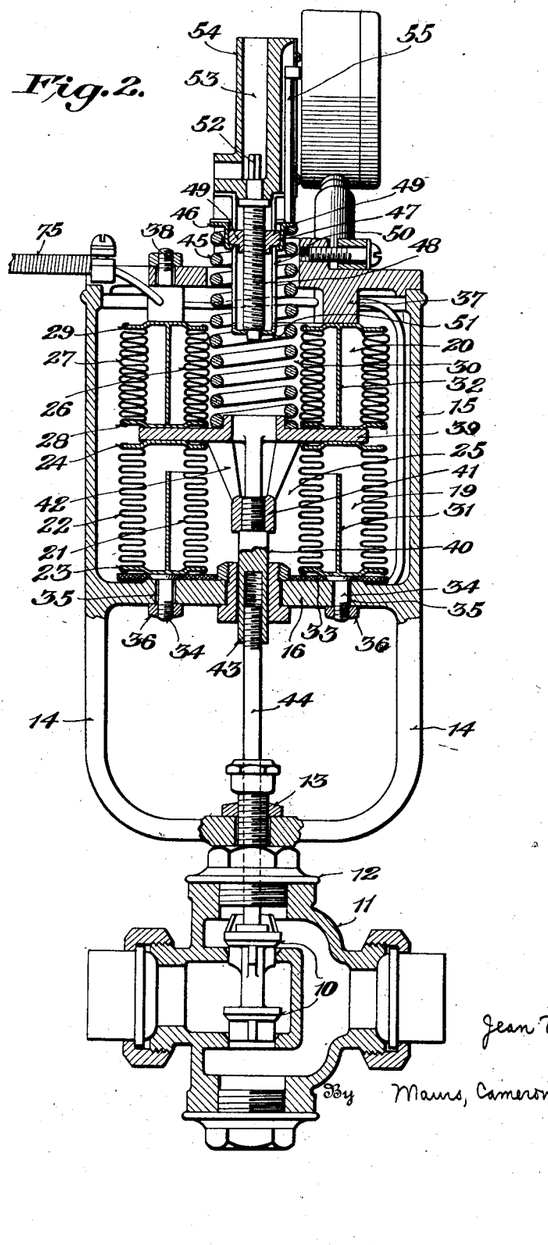
Fig. 2 is a section on an enlarged scale through the motor unit including the expansible and collapsible vessels and taken on a plane at right angles to the plane of Fig. 1.
Figure 4:
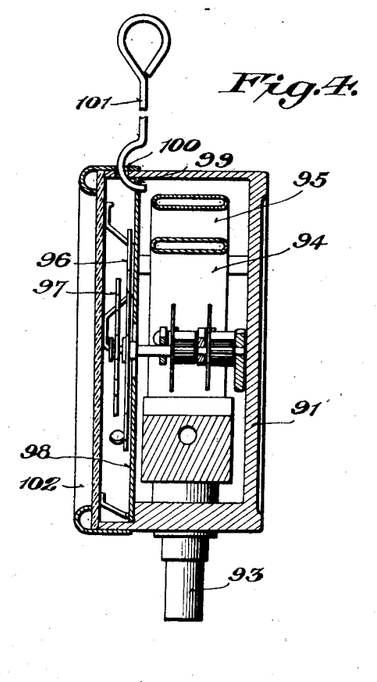
Fig. 4 is a section at right angles to Fig. 3 illustrating the manner of adjusting the dial plate of the gage.
Figure 5:
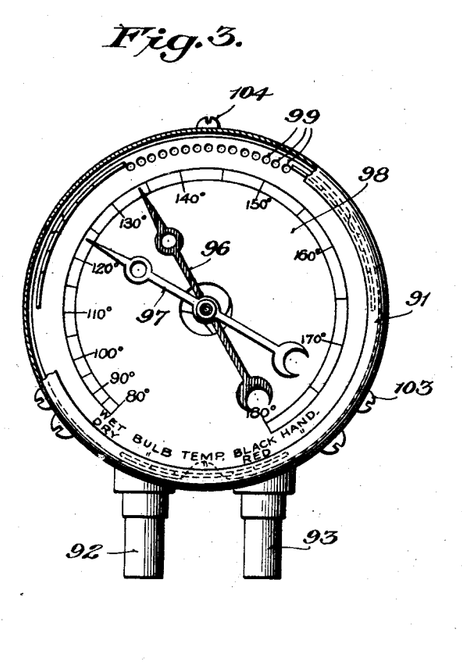

In place of two separate gages as shown in Figs. 1 and 2, a single pressure gage having two pressure responsive elements and two hands may be provided for indicating both temperatures on a single scale, as shown in Figs. 3 and 4. In the form here shown, the gage 91 is provided with two nipples 92 and 93 for connection to the respective combined bulbs and vessels, and two pressure responsive elements, as Bourdon tubes 94 and 95, respectively actuate two hands 96 and 97 movable over the dial 98 which may be calibrated in degrees of temperature. This construction possesses the advantage that the difference in temperature between the wet and the dry bulb temperatures of the air may be easily read by noting the difference between the positions of the two hands on a single dial, instead of comparing the positions of the respective hands with their respective dials as is necessary when two gages are used.

As the hydrostatic pressure existing on the pressure-responsive element of each gage will vary with the extent to which its corresponding bulb is elevated above the gage, the dial plate of the gage or gages is preferably made adjustable so as to compensate for different elevations of the bulbs. The dial plate may be adjusted in any suitable way, a convenient means of adjustment being illustrated in Figs. 3 and 4 wherein the dial plate 98 is provided with a plurality of apertures 99, and the wall of the gage housing adjacent the dial plate is provided with an aperture 100 so as to permit a hook 101 to be inserted through said aperture 100 into engagement with any of the apertures 99 and move the dial plate into proper position. Where the glass of the gage is held in position by a rim 102 secured to the housing of the gage by a plurality of screws 103, the aperture left by withdrawing one of the screws 104 may be conveniently used as the aperture through which the hook 101 is inserted into position. When separate gages are employed as shown in Figs. 1 and 2, the dial plate of each gage is preferably made adjustable as just explained.

As is well understood in the art of humidity control, the relative humidity of the air varies substantially in proportion to the difference between the wet and the dry bulb temperatures of the air. Therefore by maintaining a substantially uniform difference between the wet and the dry bulb temperatures of the air, a substantially uniform relative humidity can be maintained. The present invention is adapted to maintain the desired relative humidity by utilization of this principle. The bulb 60, subjected directly to the temperature of the air, varies in temperature with the dry bulb temperature of the air. The bulb 61, on the other hand, is cooled by the evaporation of water from the wick 80 and is at the wet bulb temperature of the air. As the pressure of the vapor or other thermosensitive fluid in each of the bulbs 60 and 61 varies with the temperature at the respective bulbs, and as the pressure in the respective bulbs is transmitted through the communicating tubes 66 and 71 respectively to the fluid in the vessels 19 and 20 respectively, the pressure existing in said vessels is in direct proportion to the dry and the wet bulb temperatures of the air respectively. As said vessels are mounted with their remote end walls held fixedly in position and their movable end walls acting in opposition on the common movable wall 39, said wall 39 is accordingly moved in one direction or the other by amounts which vary in direct proportion to the variations in the difference between the wet and the dry bulb temperatures of the air. As said movable wall 39 is directly connected to the valve 10, the latter is therefore moved to control the supply of moisture to the air so as to maintain a substantially uniform relative humidity.

As the wet bulb temperature of the air is always below the dry bulb temperature of the air up to the point of complete saturation of the air, the vessel 19 would always be expanded in excess of vessel 20 at all conditions of humidity below complete saturation if no auxiliary force were employed to oppose expansion of the vessel 19. By supplying the spring 45 to oppose expansion of the vessel 19 and contraction of the vessel 20, however, vessel 19 can not expand and contract the vessel 20 until the difference between the wet and the dry bulb temperatures of the air has resulted in such a difference in pressure in the vessels 19 and 20 as to overcome the tension of the spring 45. Thereafter, the variations in the difference between the wet and the dry bulb temperatures of the air will result in differential expansion and contraction of said vessels. Therefore by predetermining the tension of the spring 45 any desired predetermined difference between the wet and the dry bulb temperatures of the air can be maintained. This adjustment of the tension of the spring 45 is effected by engaging the proper key with the end 52 of the threaded stem 48 and rotating said stem in one direction or the other to cause the nut 47 to move upwardly or downwardly on said threaded stem, thereby decreasing or increasing the tension of the spring 45. The degree of tension of said spring is indicated by the position of the pointer 56 on the calibrated scale 57 and, for convenience in setting the instrument, said scale is preferably calibrated in terms of temperature difference. The difference between the wet and the dry bulb temperatures of the air is indicated by the position of the hands on the gages 87 and 90, or the position of the two hands on the single dial plate 91, and as these gages are located adjacent the vessels 19 and 20 and in proximity to the adjusting mechanism for the spring, it becomes a simple matter to follow the operation of the instrument and adjust it at the valve to be controlled.

As heretofore pointed out, the elevation of the bulbs 60 and 61 above the gage or gages will vary the hydrostatic pressure at said gages. By mounting the bulbs 60 and 61 as a unit and in axial alignment, so that they may be mounted at the same level, the hydrostatic pressure on each of the gages, or on each of the pressure responsive elements of the single gage, will be the same under the same conditions, so that no correction need be allowed for a difference in hydrostatic pressure. When the bulbs are installed the dial plate of the single gage 91, or the dial plates of the two gages 87 and 90, may be adjusted so that the temperatures indicated at the gage or gages will conform with the temperatures at the bulbs. Thus a thermometer may be located at the dry bulb 60, and when the conditions have become stabilized, the dial plate may be adjusted so that the same temperature will be indicated at the gage. The spring 45 may then be adjusted to maintain a desired difference between the wet and the dry bulb temperatures of the air by adjusting the nut 47 until the pointer 56 is opposite the proper mark on the scale plate 57. When the conditions have become stabilized the difference in the readings of the gage or gages showing the wet and the dry bulb temperatures may be noted and, if this does not conform with the setting of the instrument, the screws 58 may be loosened and scale plate 57 adjusted until the difference between the wet and the dry bulb temperatures is correctly indicated by the pointer 56 on the calibrations of the scale 57.

Thereafter the predetermined difference in the wet and the dry bulb temperatures of the air will be maintained automatically, and this difference can be predetermined by adjusting the pointer 56 on the scale 57 to the desired setting. As the difference between the wet and the dry bulb temperatures of the air, for any given dry bulb temperature of the air, which corresponds to any desired relative humidity can readily be obtained from standard tables, the instrument may be adjusted by noting the dry bulb temperature of the air from the gage and then setting the pointer 56 at the mark indicating the difference in the wet and the dry bulb temperatures which corresponds to the desired relative humidity. Thereby any desired relative humidity can be maintained with substantial uniformity.

The wall of the housing 15 is preferably spaced a short distance from the exteriors of the vessels 19 and 20 so as to permit a ready circulation of air through said housing. Admission of air to the interior of the housing is permitted by the openings 17, while the cap is also preferably provided with one or more apertures to facilitate circulation of the air. The plate of insulating material 33, on the other hand, minimizes the conduction of heat from the frame 14 to the vessel 19, so that heat conducted from the valve housing 11 will not affect the operation of the vessels. If the heated currents of air rising from the valve housing 11 are likely to affect the operation of the instrument, however, the instrument can be readily inverted and located below, instead of above the valve housing, so that currents of air flowing through the housing will be relatively cool.

It will therefore be perceived that a compact and efficient device for regulating humidity has been provided in which the motor vessels are mounted as a compact and simple unit, and in which the bulbs are also mounted as a compact and simple unit, and in which mechanisms for adjusting and indicating the relative humidity to be maintained and for indicating at the adjusting mechanism the wet and the dry bulb temperatures of the air have been mounted in unitary relationship with said vessels. By constructing said vessels of annular formation, a chamber is provided at the axis thereof for housing the connections to the means to be controlled and the means for adjusting the instrument, so that the housing 15 may closely surround the expansible and collapsible vessels and the instrument occupy a minimum of space. The instrument is also particularly easy to set owing to the provision of means at the vessels for indicating the temperatures existing at the bulbs because adjustment of the instrument can be effected without the necessity of going to the remote points at which the bulbs are ordinarily installed. At the same time the device is relatively simple in construction and inexpensive to manufacture and, owing to its construction as a self-contained unit, easy to transport and install.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art. Thus recording gages may be used in place of indicating gages and in either event the gages may be located at any point at which it is desired to observe the operation of the instrument by interposing suitable connecting tubing between the gages and the combined bulbs and vessels. While the means for adjusting the difference to be maintained between the wet and the dry bulb temperatures of the air has been shown as a coil spring, it is to be understood that any other suitable adjusting mechanism may be employed, and, while a coil spring is preferred, many of the advantages of the present invention could be retained while using, and it is within the contemplation of this invention to employ, other means to oppose the expansion of the motor vessel connected to the dry bulb. Numerous other changes may also be made in the details of construction, proportion and arrangement of the parts, and certain features may be used without other features, without departing from the spirit of this invention. While the invention has been shown as embodied only in a device for regulating humidity, certain features thereof are capable of a wide variety of uses:—for example, the novel arrangement of vessels annular in cross-section is applicable to a variety of structures wherein an element to be controlled is operated by the combined action of two expansible and collapsible vessels, and the indication of the temperature at the bulb of a thermosensitive device at a point remote from said bulb is also applicable to a wide variety of devices other than devices for regulating humidity. Therefore reference is to be had to the appended claims for a definition of the limits of the invention.

What is claimed is:—

1. In a humidity controlling device, the combination of means for regulating the supply of moisture and means for operating said regulating means responsive to the wet and dry bulb temperatures of the air, said operating means including juxtaposed and axially aligned expansible and collapsible vessels the interiors of which are annular in cross section so as to provide aligned chambers extending throughout the length of said vessels.

2. In a humidity controlling device, the combination of means for regulating the supply of moisture and means for operating said regulating means responsive to the wet and dry bulb temperatures of the air, said operating means including juxtaposed expansible and collapsible vessels acting in opposition and having inner and outer concentric tubular walls to provide annular fluid containing spaces and central chambers at the axes of said vessels.

3. In a humidity controlling device, the combination of means for regulating the supply of moisture and means for operating said regulating means responsive to the wet and dry bulb temperatures of the air, said operating means including a pair of expansible and collapsible vessels having inner and outer corrugated flexible tubular walls, said inner walls forming a central chamber coextensive with the length of said vessels.

4. In a humidity controlling device, the combination of means for regulating the supply of moisture and means for operating said regulating means responsive to the wet and dry bulb temperatures of the air, said operating means including adjacent expansible and collapsible vessels each of which is annular in cross section throughout and connections between said vessels and said regulating means in the chamber at the axis of said vessels.

5. In a humidity controlling device, the combination of means for regulating the supply of moisture and means for operating said regulating means responsive to the wet and dry bulb temperatures of the air, said operating means including adjacent expansible and collapsible vessels each of which is annular in cross section throughout and a member on which said vessels act interposed between said vessels and connected to said regulating means through the chamber at the axis of said vessels.

6. In a humidity controlling device, the combination of means for regulating the supply of moisture and means for operating said regulating means responsive to the wet and dry bulb temperatures of the air, said operating means including adjacent opposed expansible and collapsible vessels annular in cross section, said vessels having their remote end walls held fixedly in position, an intermediate member moved by the differential action of said vessels and connections from said member to said regulating means extending axially of said vessels.

7. In a humidity controlling device, the combination of means for regulating the supply of moisture and means for operating said regulating means responsive to the wet and dry bulb temperatures of the air, said operating means including adjacent expansible and collapsible vessels annular in cross section to form a central chamber coextensive in length with said vessels, connections between said vessels and said regulating means, and means in the chamber at the axis of said vessels for opposing movement of said connections in one direction.

8. In a humidity controlling device, the combination of means for regulating the supply of moisture and means for operating said regulating means responsive to the wet and dry bulb temperatures of the air, said operating means including adjacent expansible and collapsible vessels annular in cross section to form a central chamber coextensive in length with said vessels, a member moved by the differential action of said vessels, connections from said member to said regulating means in the chamber at the axis of said vessels, and means in said chamber for opposing movement of said member in one direction.

9. In combination, two juxtaposed expansible and collapsible vessels annular in cross section to provide contiguous chambers at the axes of said vessels, said vessels being charged with a fluid, means whereby the pressure of the fluid in said vessels is respectively controlled by the wet and the dry bulb temperatures of the air, means in one of said chambers for opposing contraction of one and expansion of the other of said vessels, and a means to be controlled operated by the differential expansion and contraction of said vessels.

10. In combination, two opposed expansible and collapsible vessels annular in cross section to provide contiguous chambers at the axes of said vessels and having their remote end walls mounted fixedly in position, said vessels being charged with a fluid, means whereby the pressure of the fluid in said vessels is respectively controlled by the wet and the dry bulb temperatures of the air, a means to be controlled, a single member acting as the movable end wall of both of said vessels and operatively connected to said means to be controlled through one of said chambers, and a spring acting on said member in one of said chambers.

11. In combination, two expansible and collapsible vessels annular in cross section throughout their length and operating by differential expansion and contraction, a means to be controlled, and a connection between said vessels and said means in the chamber at the axis of said vessels.

12. In combination, two expansible and collapsible vessels annular in cross section throughout their length and operating by differential expansion and contraction, a means to be controlled, connections between said vessels and said means, and means for controlling the expansion and contraction of said vessels in the chamber at the axis of said vessels.

13. In combination, two expansible and collapsible vessels annular in cross section throughout their length and operating by differential expansion and contraction, a means to be controlled, connections between said vessels and said means extending in the chamber at the axis of said vessels, and means in said chamber for controlling expansion and contraction of said vessels.

14. In combination, two expansible and collapsible vessels annular in cross section throughout their length and operating by differential expansion and contraction, a fluid in each of said vessels, means whereby the pressure of the fluid in said vessels is respectively controlled by the wet and the dry bulb temperatures of the air, a means to be controlled, and a connection between said vessels and said means in the chamber at the axis of said vessels.

15. In combination, two expansible and collapsible vessels annular in cross section throughout their length and operating by differential expansion and contraction, a fluid in each of said vessels, means whereby the pressure of the fluid in said vessel is respectively controlled by the wet and the dry bulb temperatures of the air, a means to be controlled, connections between said vessels and said means, and means for controlling the expansion and contraction of said vessels in the chamber at the axis of said vessels.

16. In combination, two expansible and collapsible vessels annular in cross section throughout their length and operating by differential expansion and contraction, a fluid in each of said vessels, means whereby the pressure of the fluid in said vessels is respectively controlled by the wet and the dry bulb temperatures of the air, a means to be controlled, connections between said vessels and said means in the chamber at the axis of said vessels, and means in said chamber for controlling the expansion and contraction of said vessels.

17. In combination, a pair of annular expansible and collapsible vessels arranged end to end and having inner and outer corrugated flexible tubular walls, a means to be controlled, and connections between said vessels and said means in the inner central chamber of said vessels.

18. In combination, a pair of annular expansible and collapsible vessels arranged end to end and having inner and outer corrugated flexible tubular walls, a means to be controlled, connections between said vessels and said means, and means for opposing movement of said connections in one direction, said connections and means extending within the inner central chamber of said vessels.

19. In combination, a pair of expansible and collapsible vessels, a bulb connected to each of said vessels and charged with a fluid, means mounting said bulbs as a unit in axial alignment and at the same level, means for subjecting one of said bulbs to the wet bulb temperature of the air, the other of said bulbs being subjected to the dry bulb temperature of the air, and a connection between said vessels and a means to be controlled.

20. In combination, a pair of unitarily mounted expansible and collapsible vessels having adjacent movable end walls acting in opposition, a bulb connected to each of said vessels and charged with a fluid, means mounting said bulbs as a unit and at the same level, means for subjecting one of said bulbs to the wet bulb temperature of the air, the other of said bulbs being subjected to the dry bulb temperature of the air, and a connection between said vessels and a means to be controlled.

21. In combination, a pair of annular expansible and collapsible vessels arranged end to end and having inner and outer corrugated flexible tubular walls, a means to be controlled connected to said vessels, and means in the inner central chamber of said vessels for opposing movement of said means in one direction.

22. In a humidity controlling device, the combination of means for regulating the supply of moisture and means for operating said regulating means, said operating means including a pair of opposed expansible and collapsible vessels annular in cross section and arranged end to end, said vessels having a common movable end wall operatively connected to said regulating means, and means cooperating with said movable end wall within the central chamber of said vessels for regulating the movement thereof.

23. In a humidity controlling device, the combination of means for regulating the supply of moisture and means for operating said regulating means, said operating means including a pair of opposed expansible and collapsible vessels annular in cross section and having a common movable end wall connected to said regulating means through the chamber at the axis of said vessels.

24. In combination, a pair of opposed annular expansible and collapsible vessels arranged end to end and having a common movable end wall and relatively fixed opposite end walls, said vessels being each charged with a fluid, means whereby the pressure of the fluid in said vessels is respectively controlled by the wet and the dry temperatures of the air, a spring cooperating with said movable end wall in the central chamber of said vessels, and means to be controlled operated by the movement of said movable end wall.

25. In combination, a pair of opposed expansible and collapsible vessels annular in cross section, said vessels having a common movable end wall and relatively fixed opposite end walls, a fluid in each of said vessels, means whereby the pressure of the fluid in said vessels is respectively controlled by the wet and the dry bulb temperatures of the air, means to be controlled, and connections between said means and said movable end wall extending through the chamber at the axis of said vessels.

26. In combination, a pair of opposed annular expansible and collapsible vessels, a housing therefor cooperating therewith to mount said vessels as a unit in end to end relationship and to retain the remote end walls of said vessels in fixed position, an interposed movable end wall for both of said vessels, and connections from said movable end wall to a means to be controlled.

27. In combination, a pair of opposed expansible and collapsible vessels annular in cross section, a housing therefor cooperating therewith to mount said vessels as a unit and to retain the remote end walls of said vessels in fixed position, an interposed movable end wall for both of said vessels, and a means to be controlled connected to said movable end wall through the chamber at the axis of said vessels.

28. In combination, a pair of opposed expansible and collapsible vessels annular in cross section, a housing for said vessels affording abutments for the remote end walls of said vessels, bulbs respectively communicating with said vessels at their respective abutments, a movable wall between said vessels and a means to be controlled connected to said movable wall through the chamber at the axis of said vessels.

29. In combination, a pair of opposed expansible and collapsible vessels annular in cross section, a housing for said vessels affording abutments for the remote end walls of said vessels, bulbs respectively in communication with said vessels, means for subjecting one of said bulbs to the wet bulb temperature of the air, the other of said bulbs being subjected to the dry bulb temperature of the air, a movable wall between said vessels, and a means to be controlled connected to said movable wall through the chamber at the axis of said vessels.

30. In combination, a pair of opposed expansible and collapsible vessels annular in cross section, a housing for said vessels affording abutments for the remote end walls of said vessels, bulbs respectively subjected to the wet and the dry bulb temperatures of the air and respectively in communication with said vessels, said bulbs being mounted as a unit in axial alignment, a movable wall between said vessels, and a means to be controlled connected to said movable wall through the chamber at the axis of said vessels.

31. In a device for regulating humidity, the combination of a regulating device, a pair of expansible and collapsible vessels operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, and a gage communicating with each combined bulb and vessel.

32. In a device for regulating humidity, the combination of a regulating device, a pair of expansible and collapsible vessels operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, and a gage communicating with each combined bulb and vessel and including an adjustable dial plate.

33. In a device for regulating humidity, the combination of a regulating device, a pair of expansible and collapsible vessels operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, a gage communicating with each combined bulb and vessel, a spring for opposing movement of said regulating device in one direction, means for adjusting said spring, and an indicating plate for said adjusting means calibrated to permit adjustment of the spring by reference to the gage readings.

34. In a device for regulating humidity, the combination of a regulating device, a pair of expansible and collapsible vessels operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, pressure gage means communicating with said vessels for indicating the difference in the wet and the dry bulb temperatures of the air, means for opposing movement of the regulating device in one direction, and means for adjusting said last-named means to maintain a substantially uniform difference between the wet and the dry bulb temperatures of the air.

35. In a device for regulating humidity, the combination of a regulating device, a pair of expansible and collapsible vessels annular in cross section operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, a spring in the chamber at the axis of said vessels for opposing movement of said regulating device in one direction, and means for adjusting said spring.

36. In a device for regulating humidity, the combination of a regulating device, a pair of expansible and collapsible vessels annular in cross section operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, and resilient means in the chamber at the axis of said vessels for opposing movement of said regulating device in one direction whereby said regulating device is moved only when a predetermined difference exists between the wet and the dry bulb temperatures of the air.

37. In a device for regulating humidity, the combination of a regulating device, a pair of expansible and collapsible vessels operatively connected to said regulating device to control the same by their differential expansion and contraction, bulbs respectively connected to said vessels and subjected respectively to the wet and the dry bulb temperatures of the air, each combined bulb and vessel being charged with a thermosensitive fluid, and means connecting said bulbs as a unit whereby they may be mounted independently of said vessels and at substantially the same height.

38. In a device for regulating humidity, the combination of a regulating device, a pair of opposed expansible and collapsible vessels annular in cross section, bulbs respectively communicating with said vessels and respectively subjected to the wet and the dry bulb temperatures of the air, and a member between said vessels connected to said regulating device through the chamber at the center of said vessels.

39. In a device for regulating humidity, the combination of a regulating device, a pair of opposed expansible and collapsible vessels annular in cross section, bulbs respectively communicating with said vessels and respectively subjected to the wet and the dry bulb temperatures of the air, a member between said vessels connected to said regulating device, and means in the chamber at the center of said vessels for opposing movement of said member in one direction.

40. In combination, an expansible and collapsible vessel operatively connected to a means to be controlled, a bulb in communication with said vessel, said bulb and vessel being charged with a thermosensitive fluid, and a gage communicating with said combined bulb and vessel adjacent said vessel for indicating the temperature at said bulb.

41. A humidity regulating unit including the combination of a pair of annular expansible and collapsible vessels mounted as a unit in opposing relationship and having a common movable wall, a connection in the chamber at the axis of said vessels common to both of said vessels for connecting said vessels to a regulating device, and bulbs respectively in communication with said vessels and respectively subjected to the wet and the dry bulb temperatures of the air.

42. A humidity-regulating unit including the combination of a pair of annular expansible and collapsible vessels mounted as a unit in opposing relationship and having a common movable wall, a connection in the chamber at the axis of said vessels common to both of said vessels for connecting said vessels to a regulating device, and bulbs respectively in communication with said vessels and respectively subjected to the wet and the dry bulb temperatures of the air, said bulbs being mounted as a unit in axial alignment.

43. A humidity-regulating unit including in combination a pair of opposed expansible and collapsible vessels mounted as a unit and provided with a common connection to a regulating device, bulbs respectively in communication with said vessels and respectively subjected to the wet and the dry bulb temperatures of the air, and indicating means mounted as a unit with said vessels for indicating the temperatures at said bulbs.

44. A humidity-regulating unit including in combination a pair of opposed expansible and collapsible vessels mounted as a unit and provided with a common connection to a regulating device, bulbs respectively in communication with said vessels and respectively subjected to the wet and the dry bulb temperatures of the air, an adjustable spring for controlling the expansion and contraction of said vessels, means for indicating the adjustment of said spring, and means for indicating the temperature at said bulbs, said spring and both of said indicating means being mounted in unitary relationship with said vessels.

45. In combination, an expansible and collapsible vessel operatively connected to a means to be controlled, a bulb in communication with said vessel, said bulb and vessel being charged with a thermosensitive fluid, a gage communicating with said combined bulb and vessel for indicating the temperature at said bulb and including a dial plate, and means whereby said dial plate may be adjusted to compensate for different elevations of said bulb.

46. In combination, in a humidity controlling device, a pair of expansible and collapsible vessels operatively connected to means to be controlled, a bulb in communication with each vessel, each combined bulb and vessel being charged with a thermosensitive fluid and said bulbs being respectively subjected to the wet and the dry bulb temperatures of the air, and gages respectively communicating with said combined bulbs and vessels for respectively indicating the temperature of the corresponding bulbs, each gage including a dial plate and means whereby said dial plate may be adjusted to compensate for different elevations of its corresponding bulb.

In testimony whereof I have signed this specification.

JEAN V. GIESLER.